UNITED STATES PATENT OFFICE.

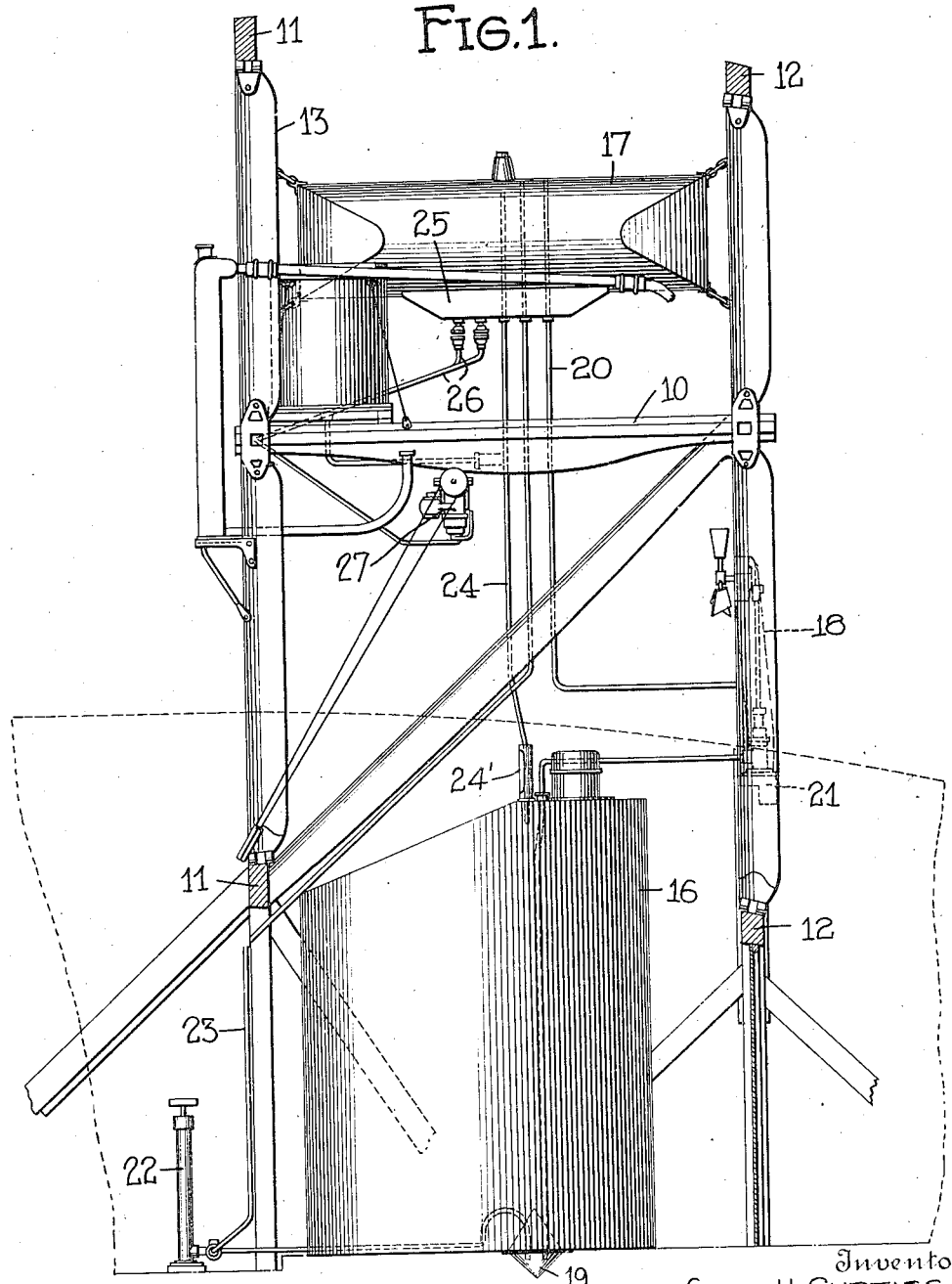

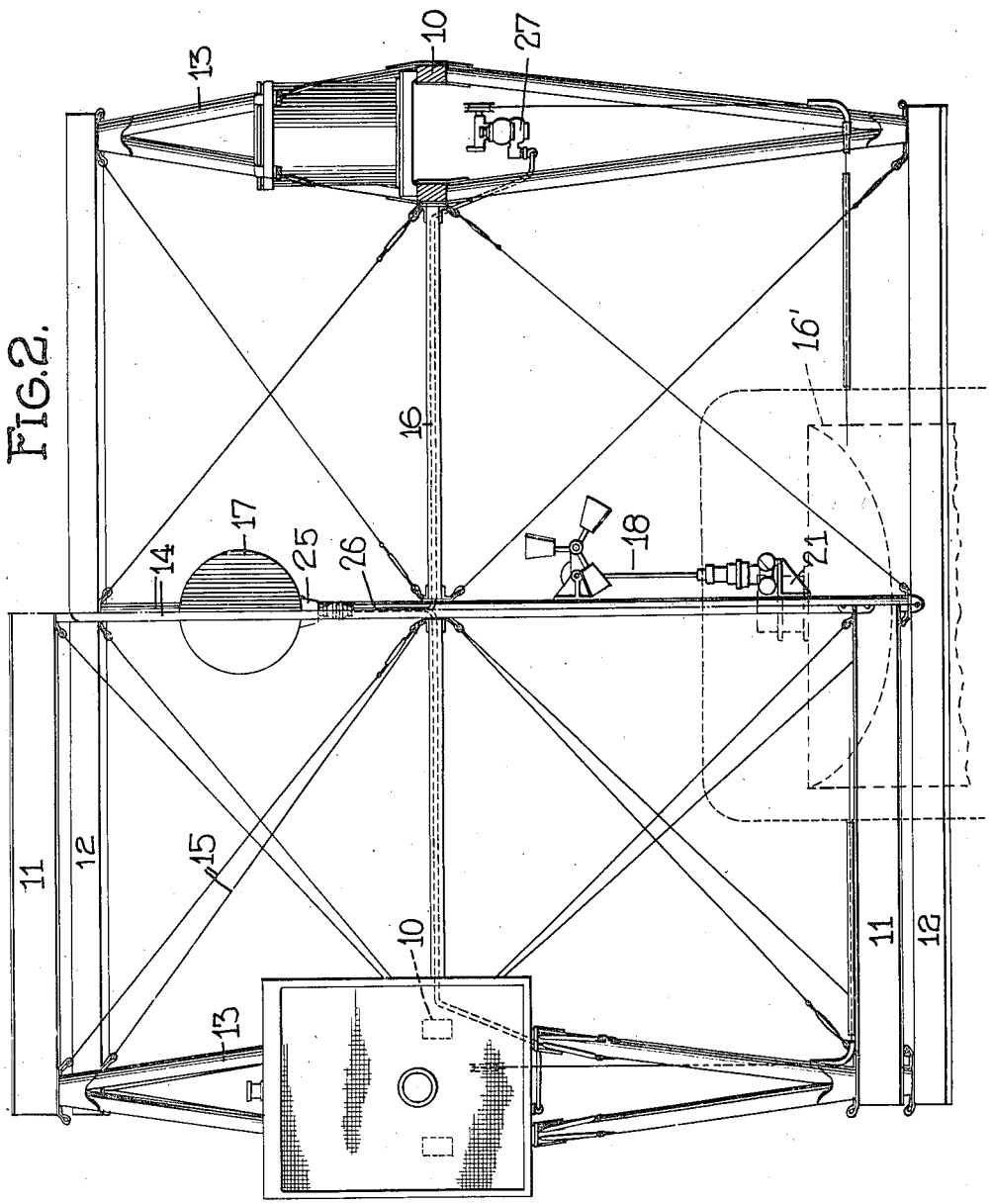

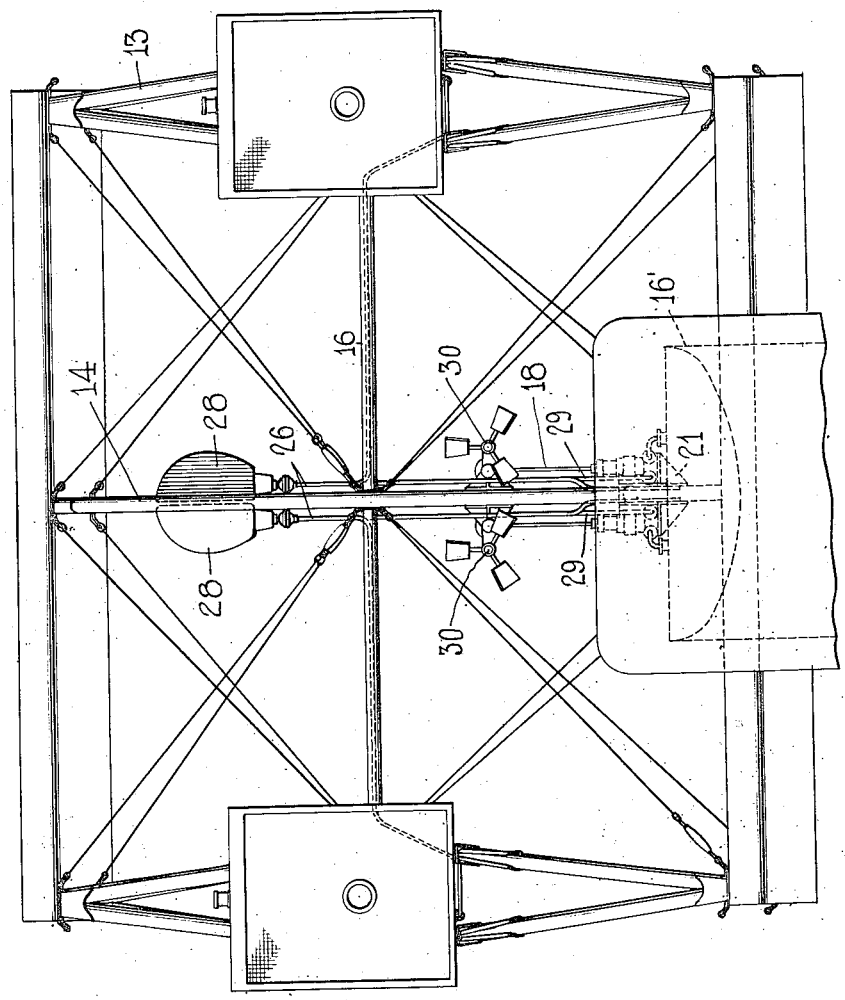

GLENN H. CURTISS, OF BUFFALO, NEW YORK, ASSIGNOR TO CURTISS AEROPLANE AND MOTOR CORPORATION, A CORPORATION OF NEW YORK.

FUEL-SUPPLY SYSTEM.

1,323,843.  Specification of Letters Patent.  Patented Dec. 2, 1919.

Continuation in part of application Serial No. 65,373, filed December 6, 1915. This application filed May 14, 1917. Serial No. 168,586.

*To all whom it may concern:*

Be it known that I, GLENN H. CURTISS, a citizen of the United States, residing at Buffalo, in the county of Erie and State of New York, have invented certain new and useful Improvements in Fuel-Supply Systems, of which the following is a specification.

This application is a continuation in part of my original application filed December 6th, 1915, Serial No. 65,373, Patent No. 1,246,016.

The invention of this application relates to a power plant for aircraft and particularly to a multi-motored craft with an improved fuel supply system therefor. The improvements will be more particularly pointed out in the following description of the drawings accompanying this application and in the claims annexed to the specification.

Of the drawings

Figure 1 is a longitudinal vertical sectional view through the engine section of a flying boat, the dotted lines indicating the hull or body of the boat, and Fig. 2 is a part front end elevation and part transverse vertical section of that portion of the craft illustrated in Fig. 1.

And Fig. 3 is a view similar to Fig. 2 showing a modified form of the applicant's improvements.

In the selected embodiment of the invention, two motor units, or rather, the beds for two motor units, are disclosed. These beds, designated 10, 10 are located symmetrically at opposite sides of the fore and aft axis of the craft intermediate the supporting surfaces (of which there are two). Only the engine section panels of said surfaces are shown. Said panels are founded by front and rear wing beams 11, 11 and 12, 12 of conventional form. The wing beams founding the engine sectional panel of the lower supporting surfaces extend intimately into the hull or body of the craft (indicated by dotted lines) that the engine section in its entirety may constitute a composite part thereof.

Wing post frames 13 interconnect the forward wing beams 11 and the rear wing beams 12. These frames support the engine beds 10 and may be described as of true V and inverted V form, that is, of true V form throughout a portion of their length and of inverted V form throughout the remaining portion. The beams constituting the engine beds 10 interconnect the front and rear mating diagonals of the longitudinally alined wing post frames. Centrally the engine section of the wing structure is braced by what I shall hereinafter designate center wing posts 14. These posts in conjunction with the wing post frames 13 and cross arranged stays 15 truss the engine section panel throughout. Cross braces 16 interconnect the adjacent beams of the engine beds by way of the center wing posts 14 to take up lateral compression strains.

The foregoing structure, while preferred, does not constitute a part of the invention herein claimed. The wing post frames may be differently constructed, the engine beds rearranged and the engine section panels differently trussed. Such differentiations are immaterial although the structure disclosed is characteristic of the "Curtiss" flying boat. Furthermore, if desired, but one motor may be used.

As pointed out hereinbefore the system of my invention comprises a source of fuel supply, i. e. a reservoir 16', a gravity tank 17, and a pumping unit designated in its entirety by the numeral 18. The reservoir 16' is preferably located interiorly of the hull or body of the craft in the approximate transverse vertical plane of the center of gravity. It is from this reservoir that the fuel supply to the tank 17 is drawn. Said reservoir at its base is equipped with a pump 19 into which a supply lead 20 extends. This lead is preferably let through the top of the reservoir, extended rearwardly, upwardly, forwardly and thence upwardly into the tank 17, discharging into the said tank adjacent its top. The fuel is in this way drawn from the extreme bottom of the reservoir and carried to the extreme top of the gravity tank.

Interpolated in the connection 20 between the reservoir and tank is the pumping unit 18. Said unit is of the fan type, being driven by the air rush incident to flight. It is supported interiorly of the hull or body upon a bracket 21 fastened to the rear center wing post 14. In this way the major portion of the pump is inclosed and only that portion constituting and supporting the fan proper is exposed. The capacity of the pump is such that fuel is supplied to the tank 17 in excess of the motor demand. This is desirable, first in the interest of safety, as hereinbefore explained, and second, in that the tank 17 is kept full so long as the source of supply continues. In addition to the fan driven pump 18 a hand pump 22 is provided. Said pump 22 is also interpolated in a connection between the reservoir 16' and the tank 17. This connection, designated 23, is separate and independent of the connection 20, and like said connection 20, draws its supply from the sump 19 of the reservoir, and discharges it into the tank 17 in a manner similar to that of the first mentioned connection. The pumps 22 and 18 may be operated separately or in unison although the hand pump is intended primarily as an emergency pumping means. The pumping capacity of said pump 22 is also in excess of the motor demand.

To carry off the excess fuel pumped into the tank 17 an overflow pipe 24 is provided. This pipe extends into the said tank 17 to receive its supply at a predetermined level. At its opposite end it is let into the top of the reservoir 16' to convey by gravity the excess fuel to its original source.

Preferably the tank 17 is suspended between the center wind post frames 14 in a plane above the plane of the motor units. From a sump 25 formed in the bottom of the tank, separate leads extend to the respective motors. These leads 26 follow the forward cross brace 16 for connection with the separate carbureters of the motors. The capacity of both pumps 18 and 22 being greater than the motor demand, a continuous fuel feed by way of the leads 26 to the carbureters 27 is set up. In this way abundant fuel is supplied to the separate motors.

In addition, through interpolation of a sight gage 24' in the overflow connection between the tank and the reservoir 16', knowledge can be gained of the effectiveness of the two pumping units. Under normal conditions fuel is continuously returning to the reservoir 16'. The moment this flow ceases it is evident that something is wrong or that the fuel supply is exhausted except for the fuel contained in the tank 17. In this way the pilot is made cognizant of the fact that the fuel supply is about exhausted and that little time should be lost in seeking a proper place to land. By duplicating the leads 20 and the pumping units 18 or by the installation of duplicate pumps instead of the pump 18 a double factor of safety is provided. This may be desirable in craft designed for military use. Fig. 3 shows the provision of a gravity tank 28 for each separate motor unit, a separate lead 29 for supplying each tank and a separate pump 30 for each lead. By appropriate piping the pump could be made to supply the several separate tanks if the latter system be installed. Moreover, a motor driven pump may be used by appropriate connections in lieu of the fan driven pump 18. The preferred embodiment, however, is the embodiment disclosed.

In addition to its use in an emergency the hand pump 22 is used for pumping the initial supply of fuel into the tank 17. Obviously, fuel must be supplied to this tank by some means before initial flight or during motor operation while the machine is at rest. The fan pump is effective during flight only.

What is claimed is:

1. In a motive power plant for aircraft, the combination of a plurality of driving motors, a main source of liquid fuel supply therefor, a plurality of auxiliary liquid fuel supply tanks mounted above the level of both the source of fuel supply and the motors, connections between said tanks and said motors, means connected with the source of fuel supply and the auxiliary tanks for continuously pumping fuel into said tanks in excess of the demand made thereon by the motors and means for carrying the excess liquid fuel pumped to the auxiliary tanks back to the main source whereby the auxiliary fuel tanks are maintained replenished at all times and the motors may be operated independently of the main source of fuel.

2. In an aircraft, the combination of a plurality of motors for driving the same, a plurality of gravity tanks mounted in a plane above the motors, and above the source of fuel supply, a separate means for supplying each of said gravity tanks with an excess amount of fuel and means for returning the excess from the gravity tanks to the main fuel supply.

3. In an aircraft, the combination of a plurality of motors for driving the same, a common source of fuel supply for said motors, a gravity tank for each motor mounted in a plane thereabove, a supply connection between each of said tanks and the main source of supply, a pump in each supply connection adapted to pump fuel into the tank in excess of the demand from the motor, and means for returning the excess to the main source of supply.

4. In an aircraft, the combination of a driving motor therefor, a main source of fuel supply for said motor, an auxiliary supply tank mounted in a plane above the motor and above said main source of supply, means for supplying to said auxiliary tank fuel in excess of the demand made thereon by the motor and a connection between said auxiliary tank and said main source for returning the excess fuel to the main source, said return connection having a sight feed disposed therein for the purpose set forth.

In testimony whereof I hereunto affix my signature.

GLENN H. CURTISS.